US007028371B2

(12) United States Patent
VerSteeg et al.

(10) Patent No.: US 7,028,371 B2
(45) Date of Patent: Apr. 18, 2006

(54) SAFETY BRAKE FOR BLOCK AND TACKLE WINDOW BALANCE

(75) Inventors: Lawrence VerSteeg, Sioux Falls, SD (US); Gary Roger Newman, Valley Springs, SD (US)

(73) Assignee: Amesbury Group Inc., Amesbury, MA (US)

( * ) Notice: Subject to any disclaimer, the term of this patent is extended or adjusted under 35 U.S.C. 154(b) by 17 days.

(21) Appl. No.: 10/396,740

(22) Filed: Mar. 25, 2003

(65) Prior Publication Data

US 2003/0213661 A1 Nov. 20, 2003

Related U.S. Application Data

(60) Provisional application No. 60/367,990, filed on Mar. 25, 2002.

(51) Int. Cl.
*F16F 11/00* (2006.01)

(52) U.S. Cl. .......................... 16/197; 188/271; 49/181

(58) Field of Classification Search .................. 16/197, 16/196, 193, 212, 414, 445, 463, DIG. 16; 49/181, 445–447; 24/134 R, 134 KA, 134 KB; 294/135, 136, 81.61; 160/296; 188/271

See application file for complete search history.

(56) References Cited

U.S. PATENT DOCUMENTS

| | | | | |
|---|---|---|---|---|
| 1,349,037 | A * | 8/1920 | Axe et al. | 16/82 |
| 4,071,926 | A * | 2/1978 | Sweet et al. | 24/136 R |
| 4,089,085 | A * | 5/1978 | Fitzgibbon | 16/197 |
| 4,958,462 | A * | 9/1990 | Cross | 49/181 |
| 5,099,963 | A | 3/1992 | Alchin | |
| 5,737,877 | A | 4/1998 | Meunier et al. | 49/445 |
| 5,873,199 | A | 2/1999 | Meunier et al. | 49/181 |
| 6,041,475 | A * | 3/2000 | Nidelkoff | 16/193 |
| 6,115,884 | A * | 9/2000 | DeJong et al. | 16/197 |
| 6,467,128 | B1 * | 10/2002 | Damani | 16/197 |
| 6,622,342 | B1 * | 9/2003 | Annes et al. | 16/197 |
| 2003/0074764 | A1 * | 4/2003 | Pettit et al. | 16/400 |

FOREIGN PATENT DOCUMENTS

| | | | |
|---|---|---|---|
| GB | 1 495 652 | | 12/1977 |
| JP | 03009143 A | * | 1/1991 |
| JP | 05231064 | * | 9/1993 |
| WO | WO 03/023173 | | 3/2003 |

* cited by examiner

*Primary Examiner*—Robert J. Sandy
*Assistant Examiner*—Andre' L. Jackson
(74) *Attorney, Agent, or Firm*—Goodwin Procter LLP

(57) ABSTRACT

The present invention relates to inertial braking system for spring-loaded devices, such as block and tackle window balances incorporated in single and double hung window assemblies. In one embodiment, a block and tackle window balance includes a translatable block assembly disposed in a track including a pawl pivotally attached to the translatable block assembly. The pawl, in response to a rapid acceleration of the translatable block assembly, rotates about a pivot and frictionally engages the track, thereby wedging the translatable block assembly in the track. In another embodiment, the translatable block assembly includes a cam attached to the pawl and a brake shoe disposed between the cam and a cord seated within a pulley. Rotation of the pawl causes the cam to translate the brake shoe, thereby compressing the cord against the pulley.

16 Claims, 13 Drawing Sheets

SAFETY BRAKE FOR BLOCK AND TACKLE WINDOW BALANCE

CROSS-REFERENCE TO RELATED APPLICATIONS

This application incorporates by reference, and claims priority to and the benefit of U.S. Provisional Patent Application No. 60/367,990, filed on Mar. 25, 2002.

FIELD OF THE INVENTION

This invention relates to block and tackle window balance devices for single and double hung windows and, more particularly, to a block and tackle window balance device that includes a mechanical braking mechanism.

BACKGROUND OF THE INVENTION

Double hung window assemblies generally include a window frame, a lower window sash, an upper window sash, a pair of window jambs, two sets of jamb pockets, and at least one window balance device for offsetting the weight of a window sash throughout a range of travel within the window frame. A typical block and tackle window balance device uses a combination of a spring and pulleys located within a channel to balance the weight of the window sash at any position within the window jamb. In some block and tackle window balance devices, the channel containing both the spring and pulleys is attached to the window sash. The device includes a cord that passes through the pulley system and is attached to a jamb mounting hook that is connected to a side jamb.

In general, block and tackle window balance devices often incorporate springs capable of storing a substantial amount of potential energy when the springs are loaded in tension. Typically, a cord or chain is used to provide tension to the spring. Should the cord or chain break or become detached from the mounting hook, the sudden spring retraction may result in the spring mechanism becoming detached and could result in damage to the sash.

There exist several configurations of block and tackle window balance devices containing both springs and pulleys. See, for example, U.S. Pat. No. 5,737,877 issued to Meunier et al., the disclosure of which is hereby incorporated herein by reference in its entirety. Meunier discloses the use of a block and tackle balance disposed between a jambliner and a window sash. See also, for example, U.S. patent application Ser. No. 09/810,868 entitled “Block and Tackle Window Balance with Bottom Guide Roller” by Newman, the disclosure of which is also hereby incorporated herein by reference in its entirety. Newman discloses a block and tackle window balance device that provides an increased range of sash travel within a window frame.

Some window balance systems provide a manually-activated brake that can be set, for example, using a wrench, to inhibit the release of stored potential energy in a block and tackle window balance. Such manually operated brakes are user activated, for example, during an installation and/or removal procedure of the balance device. Unfortunately, manually-activated brakes will not protect against an unintentional release of stored potential energy. Further, an unskilled user may not be aware that the manually-activated brake system is available, as the brake actuator is typically located on the balance device, behind a jamb plate. Thus, it is generally hidden from view, only being observable through a small hole or narrow slit in the jamb.

SUMMARY OF THE INVENTION

The present invention solves the problem of the sudden release of window balance spring tension, such as that experienced during a failure or during improper installation, by providing an inertial braking mechanism, thereby limiting release of the spring’s stored energy.

Accordingly, in one aspect, the invention relates to an inertial braking system for a block and tackle window balance device. The device includes a channel or track, a translatable block assembly, and a brake. The translatable block assembly is moveably disposed at least partially within the track. The brake is coupled to the translatable block assembly and activates in response to a rapid acceleration of the assembly along the track.

In one embodiment the brake includes a pin or trunnion coupled to the translatable block assembly, a pawl coupled to the trunnion, and an inertial mass coupled to the pawl. The inertial mass causes the pawl to pivot about the trunnion to engage the track in response to the rapid acceleration of the translatable block assembly along the track. In another embodiment, the brake further includes a pawl bias spring. A first end of the spring is coupled to the translatable block assembly and a second end is coupled to the pawl. The pawl bias spring biases the pawl in a stowed position. In another embodiment, the pawl comprises an arcuate surface having a first end and a second end. The arcuate surface is circumferentially disposed relative to a pivot point of the trunnion and pawl assembly. A leading edge of the pawl is radially disposed relative to the pivot point, terminating at the first arcuate surface end. A first radial distance is defined from the center of the pivot point to the first end of the arcuate surface. A trailing edge of the pawl is also radially disposed relative to the pivot point, terminating at the second end of the arcuate surface. A second radial distance is similarly defined from the center of the pivot point to the second end of the arcuate surface. In one embodiment, the second radial distance is greater than the first radial distance.

In one embodiment, at least a portion of the arcuate surface includes a frictional surface. In another embodiment the frictional surface is serrated. In yet another embodiment the translatable block assembly defines a pocket in which the brake is at least partially disposed. The various components of the brake assembly can be made from metals, polymers, ceramics, woods, or combinations thereof.

In another aspect, the invention relates to a block and tackle window balance system including a channel or track, a translatable block assembly moveably disposed at least partially within the track, a balance spring having a first end fixed relative to the track and a second end coupled to one end of the translatable block assembly. The system also includes a cord having a first cord end attached to an opposite end of the translatable block assembly and a second cord end attached to a jamb. Further, the system includes a brake coupled to the translatable block assembly. The brake activates in response to a rapid acceleration of the translatable block assembly along the track.

In one embodiment, the acceleration-activated brake includes a pin or trunnion coupled to the translatable block assembly, a pawl coupled to the trunnion, and an inertial mass coupled to the pawl. The inertial mass causes the pawl to pivot about the trunnion to engage the track in response to the rapid acceleration of the translatable block assembly along the track. In another embodiment, the system further includes a cam coupled to the pawl and a brake shoe in communication with the cam. The brake shoe is disposed between the cam and at least a portion of the cord. Pivoting action of the pawl rotates the cam into communication with the brake shoe, thereby causing the brake shoe to engage the cord in response to the rapid acceleration of the translatable block assembly along the track.

In yet other embodiments, the system further includes an inertial mass coupled to the brake shoe. The inertial mass, in response to the rapid acceleration of the translatable block assembly along the track, causes the brake shoe to translate. Translation of the brake shoe causes the pawl to pivot about the trunnion to engage the track. The pivoting action of the pawl also causes the cam to pivot about the trunnion and engage the brake shoe. Pivoting of the pawl forces the brake shoe against the cord.

In one embodiment, the system further includes a bias spring. A first end of the spring is coupled to the translatable block assembly and a second end is coupled to the brake shoe. In another embodiment, the system further includes a drive train for transferring inertial energy from the brake shoe to the pawl. In one embodiment, the drive train includes a rack gear coupled to the brake shoe and a pinion gear coupled to the pawl. The rack and pinion facilitate the rotation of the pawl in response to the translation of the brake shoe.

In yet another aspect, the invention relates to a method of inhibiting rapid acceleration of a block and tackle window balance system. The method includes providing a channel or track, providing a translatable block assembly movably disposed at least partially within the track, and providing an inertially activated brake coupled to the translatable block assembly. The brake is activated in response to a rapid acceleration of the translatable block assembly in a first direction along the track.

In one embodiment, the brake includes a pin or trunnion coupled to the translatable block assembly, a pawl pivotally coupled to a trunnion, and an inertial mass coupled to the pawl. In another embodiment, activating the brake includes providing to the pawl an inertial force in response to the rapid acceleration of the translatable block assembly along the track. The method also includes pivoting the pawl about the trunnion in response to the inertial force and engaging the track in response to the pivoting of the pawl about the trunnion. In another embodiment, the brake further includes a pawl bias spring having a first end coupled to the translatable block assembly and a second end coupled to the pawl. The pawl bias spring facilitates returning the pawl to a stowed position. In yet another embodiment, the brake further includes a cam pivotally coupled to the trunnion and a brake shoe in communication with the cam.

In still other embodiments, activating the brake includes providing to the pawl an inertial force and pivoting the pawl about the trunnion. The inertial force results from the rapid acceleration of the translatable block assembly along the track. The method also includes engaging the track with the pawl in response to the pivoting of the pawl about the trunnion. Further, the method includes frictionally engaging or compressing a cord with the brake shoe, the cord including a first cord end attached to the translatable block unit and a second cord end attached to a jamb. The compressing of the cord inhibits movement of the translatable block assembly.

Further, the step of pivoting the pawl about the trunnion includes transferring inertial energy from the brake shoe to the pawl and rotating the cam about the trunnion in response to the transfer of inertial energy from the brake shoe, causing further compression of the brake shoe against the cord in response to the rotated cam. In other embodiments, the method includes deactivating the brake. Deactivating the brake can include momentarily translating the block assembly in a second direction, thereby releasing the pawl.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

Figure 1:
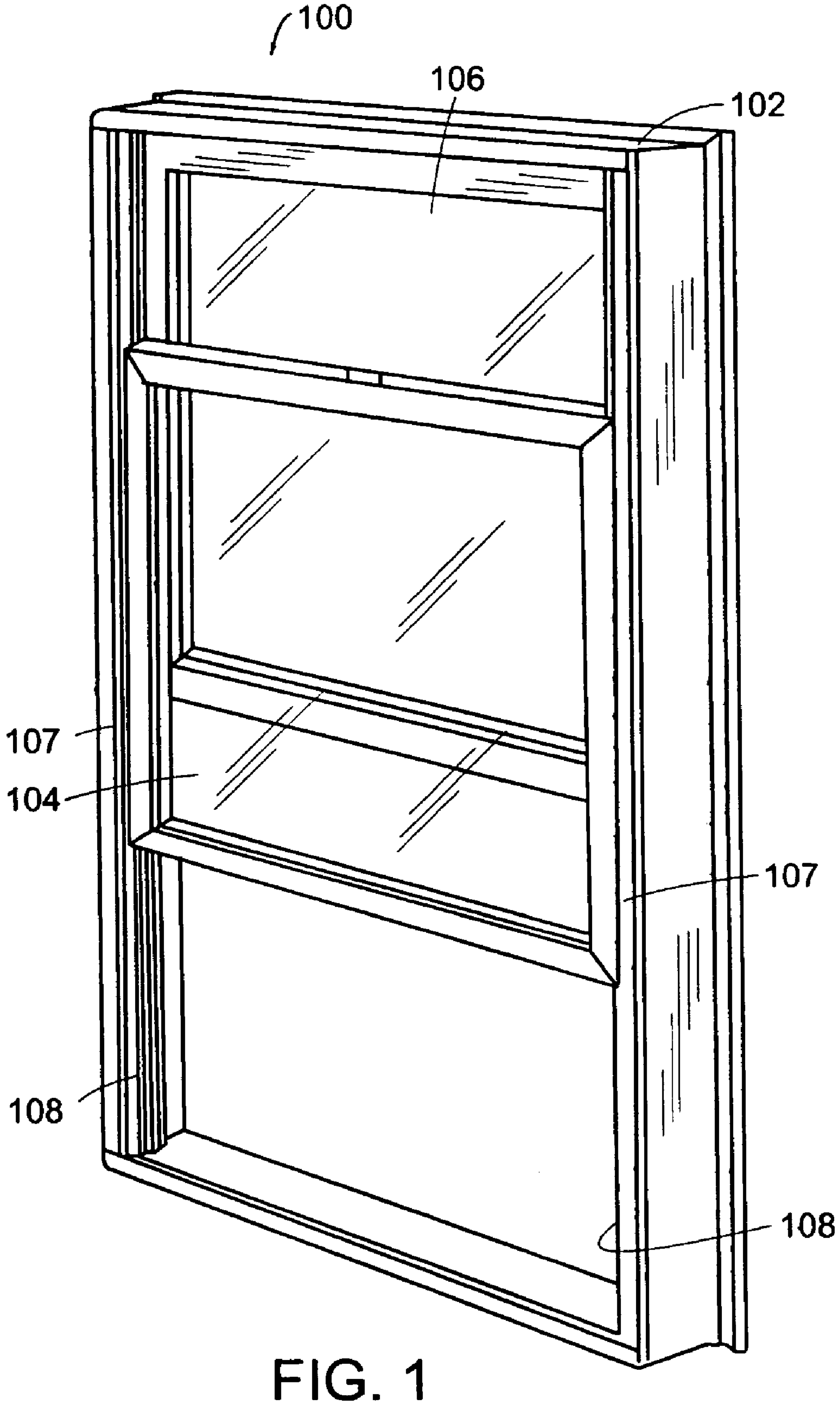
FIG. 1 is a schematic perspective view of a double hung window.

FIG. 1 depicts a double hung window assembly 100, in which a block and tackle window balance constructed in accordance with the invention can be used. The double hung window assembly 100 includes a window frame 102, a lower window sash 104, an upper window sash 106, and a pair of window jambs 107. Jamb pockets 108 are located within each window jamb 107. The lower window sash 104 and upper window sash 106 slide vertically within the jamb pockets 108. Generally, window balances are attached to the lower and upper window sashes 104, 106 to balance the weight of the window sashes 104, 106 at any vertical position within the jamb pockets 108.

Figure 2:
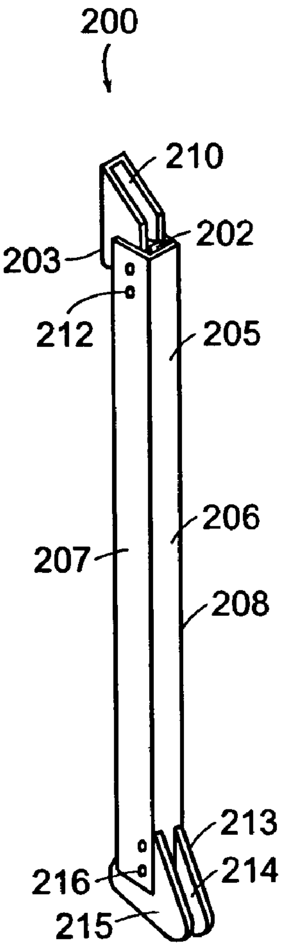
FIG. 2 PRIOR ART
FIG. 2 is a schematic perspective rear view of a prior art block and tackle window balance.
Figure 3:
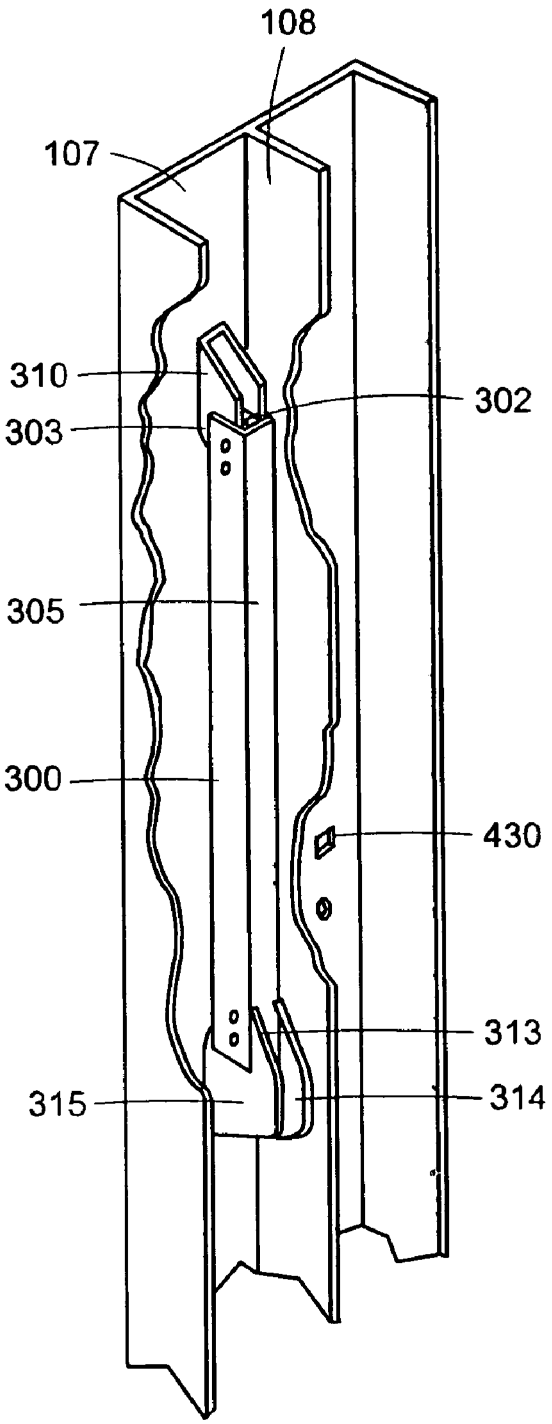
FIG. 3 is a schematic perspective view of another block and tackle window balance with side walls of a U-shaped jamb partially removed.
Figure 4A:
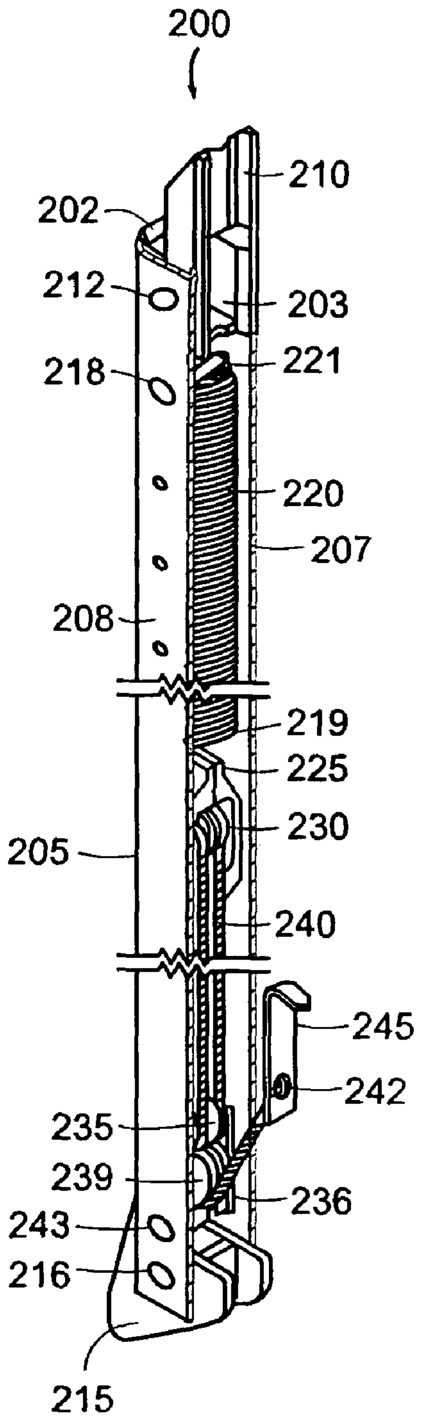
FIG. 4A PRIOR ART
FIG. 4A is a schematic perspective front view of the prior art block and tackle window balance of FIG. 2.
Figure 4B:
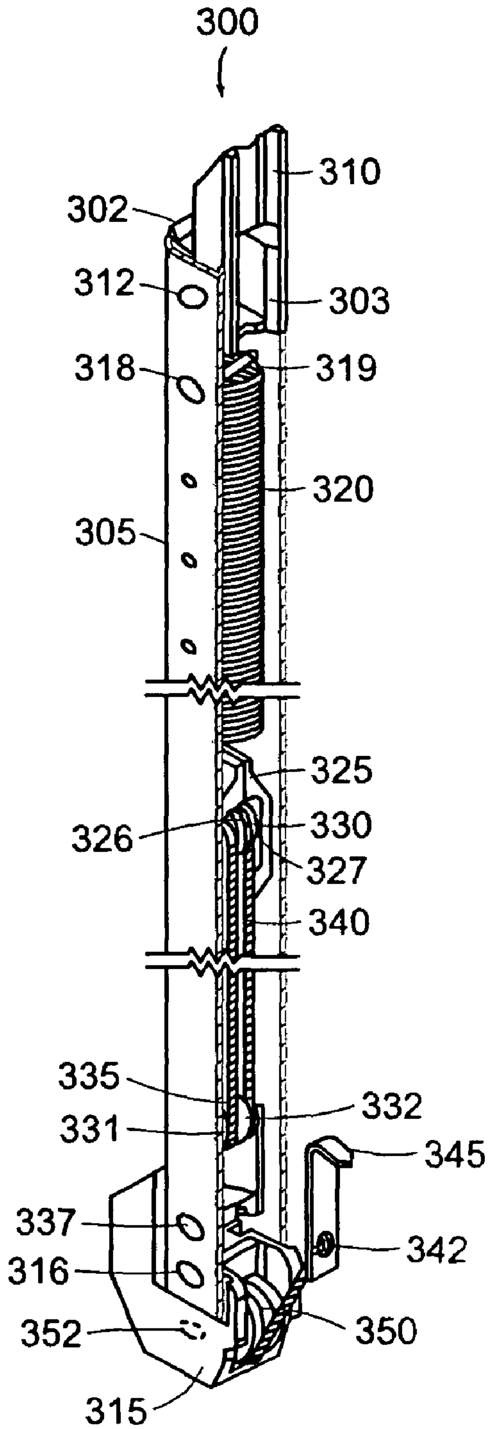
FIG. 4B is a schematic perspective front view of the block and tackle window balance of FIG. 3.

FIGS. 2, 3, 4A, and 4B depict perspective views of two block and tackle window balances 200, 300. FIGS. 2 and 4A depict, respectively, rear and front perspective views of a prior art window balance 200. FIG. 3 shows the second block and tackle window balance 300 with side walls of a rigid U-shaped jamb 107 cut away so that components of the window balance 300 are more visible. FIG. 4B shows the block and tackle window balance 300 in front perspective view.

As shown in FIGS. 2 and 4A, the block and tackle window balance 200 includes a balance spring 220, a translatable pulley unit 230, a fixed pulley unit 235, a roller 239, and a cord 240, all housed within a rigid U-shaped channel 205. Attached to the two ends of the rigid U-shaped channel 205 with fasteners 212, 216 are a top guide 210 and a bottom guide 215 that are used to connect the window balance 200 to either the upper or lower window sash 104, 106 and to help guide the vertical motion of the window balance 200 and associated sash 104, 106 within the jamb pockets 108. The top guide 210 includes an upper portion 202 and a lower portion 203. The upper portion 202 of the top guide 210 is angled and is sized to be received by a member attached to a window sash, such as a cam. The bottom guide 215 includes a back portion 213, best seen in FIG. 2, that encases a portion of the rigid channel 205. Within the back portion 213 of the bottom guide 215 is a channel 214 sized to receive a portion of the window sash 104, 106.

The rigid U-shaped channel 205 has a back wall 206 and two side walls 207, 208 that in combination form the U-shape. The rigid U-shaped channel 205 serves as an external frame to which the components of the window balance 200 can be secured. The rigid U-shaped channel 205 also keeps components located within the rigid U-shaped channel 205 free of debris and particulate matter. The balance spring 220, the translatable pulley unit 230, the fixed pulley unit 235, and the roller 239 are located inside the rigid U-shaped channel 205. Both the translatable pulley unit 230 and the fixed pulley unit 235 include one or more pulleys rotatable around respective axles.

Components within the rigid U-shaped channel 205 work in combination to generate a force to counterbalance the weight of the attached sash 104, 106 at any vertical position within the window frame 102. These components are attached to each other, such that a first end 219 of the balance spring 220 is connected to the translatable pulley unit 230 and the translatable pulley unit 230 is connected to the fixed pulley unit 235 and the roller 239 via the cord 240. A pulley in the fixed pulley unit 235 and the roller 239 may be contained in a frame 236. To secure the components within the rigid U-shaped channel 205, the second end 221 of the balance spring 220 and the frame 236 are fixed to opposite ends of the rigid U-shaped channel 205 via respective fasteners 218, 243. The frame 236 is also used to secure a pulley axle and a roller axle, around which the pulley in the fixed pulley unit 235 and the roller 239 respectively rotate. The balance spring 220 and the translatable pulley unit 230 are connected together by hooking the first end 219 of the balance spring 220 through an upper slot opening in a frame 225. The frame 225 houses the translatable pulley unit 230 and a pulley axle around which a pulley in the translatable pulley unit 230 rotates. The cord 240, which can be a rope, string, chain, cable, or other suitable element has a first end and a second end 242. The first end of the cord 240 is secured to the frame 225 and the second end 242, which is a free, is threaded through the translatable pulley unit 230, the fixed pulley unit 235, and the roller 239, thereby connecting all three components together. After the cord 240 connects the three components together, a jamb mounting attachment 245 is secured to the second end 242 of the cord 240. When the window balance 200 is located in the jamb pocket 108, the jamb mounting attachment 245 engages an opening 430 (FIG. 3) within one of the jamb pockets 108, thereby securing the window balance 200 to the window jamb 107.

The balance spring 220 provides the force required to balance the sashes 104,106. The balance spring 220 is extended when the second end 242 of the cord 240 with the jamb mounting attachment 245 is pulled, causing the frame 225 to move within the rigid U-shaped channel 205 towards the frame 236, which is fixed. As the frame 225 moves towards the frame 236, the balance spring 220 is extended in tension.

As depicted in FIGS. 3 and 4B, window balance 300 includes the rigid U-shaped channel 305, a top guide 310, a bottom guide 315, a spring 320, a translatable pulley unit 330, a fixed pulley unit 335, a bottom guide roller 350, and a cord 340. The top guide 310 and the bottom guide 315 are fixed to the rigid U-shaped channel 305 by fasteners 312, 316. The top guide 310 is used to help connect the block and tackle window balance 300 to the window sash 104, 106 and to help guide the movement of the block and tackle window balance 300 within the jamb pocket 108. The top guide 310 may include a top angled portion 302 and a bottom portion 303. The bottom guide 315 is also used for connection and guidance purposes, but the bottom guide 315 further serves as a frame for housing the bottom guide roller 350. The bottom guide 315 extends beyond the rigid U-shaped channel 305 and, therefore, the bottom guide roller 350 is located outside of the rigid U-shaped channel 305. A back portion 313 of the bottom guide 315 may include a channel 314 for receiving a portion of the window sash, as depicted in FIG. 3. Some windows have a groove running along a bottom rail of the sash. On conventional balances, the bottom guide can drop into this groove so a manufacturer needs to use a shorter balance to avoid dropping into the groove. This effectively reduces the amount of travel, because shorter balances have to be used. The bottom guide 315 is configured so the contact point of the bottom guide 315 to the sash is higher on the balance 300 so the groove is avoided and a longer balance with a greater spring force can be used. This can afford increased force for balancing the sash at any vertical position, as well as increased amount of travel resulting from the longer balance.

The spring 320, the translatable pulley unit 330, and the fixed pulley unit 335 are located within the rigid U-shaped channel 305. In the embodiment shown in FIGS. 3 and 4B, the translatable pulley unit 330 includes two pulleys 326, 327 that are rotatable about a single pulley axle; however, in other embodiments, the translatable pulley unit 330 may contain one or more pulleys rotatable about the pulley axle. Similarly, the fixed pulley unit 335, as shown in FIG. 4B, includes two pulleys 331, 332 that rotate about a single pulley axle; however, in other embodiments, the fixed pulley unit 335 may contain one or more pulleys that rotate about the pulley axle. A first end 319 of the spring 320 is fixed with respect to the rigid U-shaped channel 305 via a fastener 318. In the embodiment shown, the fastener is a rivet; however the fastener could also be a support member welded between the two side walls of the rigid U-shaped channel 305, a hook secured to or formed in the rigid U-shaped channel 305, or any other device that secures the first end 319 of the spring 320 to the rigid U-shaped channel 305. The second end 321 of the spring 320 is attached to a frame 325, which houses the translatable pulley unit 330. To connect the spring 320 to the frame 325, the second end 321 of the spring 320 hooks through an opening in the frame 325. One end of the cord 340 is attached to the frame 325 through a frame opening. The other end 342 of the cord 340 is attached to a jamb mounting hook 345. The cord 340 is threaded through the translatable pulley unit 330, the fixed pulley unit 335, and around the bottom guide roller 350, connecting the three components together. The cord 340 shown is a string; however, it may also be a rope or a cable. Both the fixed pulley unit 335 and the bottom guide roller 350 are fixed with respect to the rigid U-shaped channel 305. The fixed pulley unit 335 is housed within a frame 336 and rotates around the pulley axle. The frame 336 is secured within the rigid U-shaped channel 305 with a fastener 337. In an alternative embodiment, the frame 336 is not required, the fixed pulley unit 335 rotates around an axle supported between side walls of the rigid U-shaped channel 305. In yet another alternative embodiment, the fixed pulley unit 335 can be integral with the bottom guide 315 and as a result, fasteners 337 and 316 can be eliminated because tension of the spring 320 will keep the bottom guide 315 engaged with or connected to the rigid U-shaped channel 305. The bottom guide roller 350 is located within the bottom guide 315 and rotates around a bottom guide axle 352.

Figure 5A:
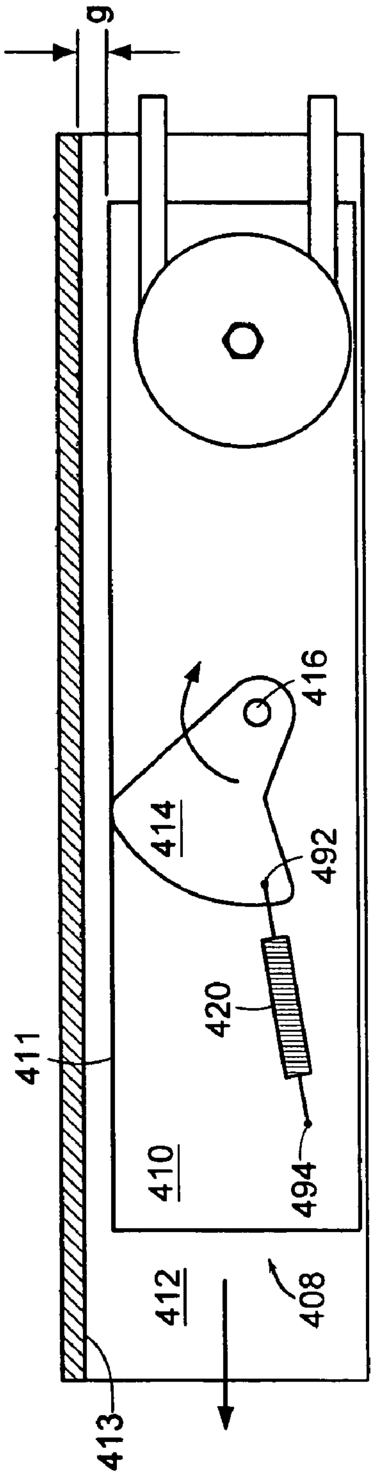
FIGS. 5A and 5B are schematic representations of one embodiment of an inertial braking assembly in accordance with the invention.
Figure 5B:
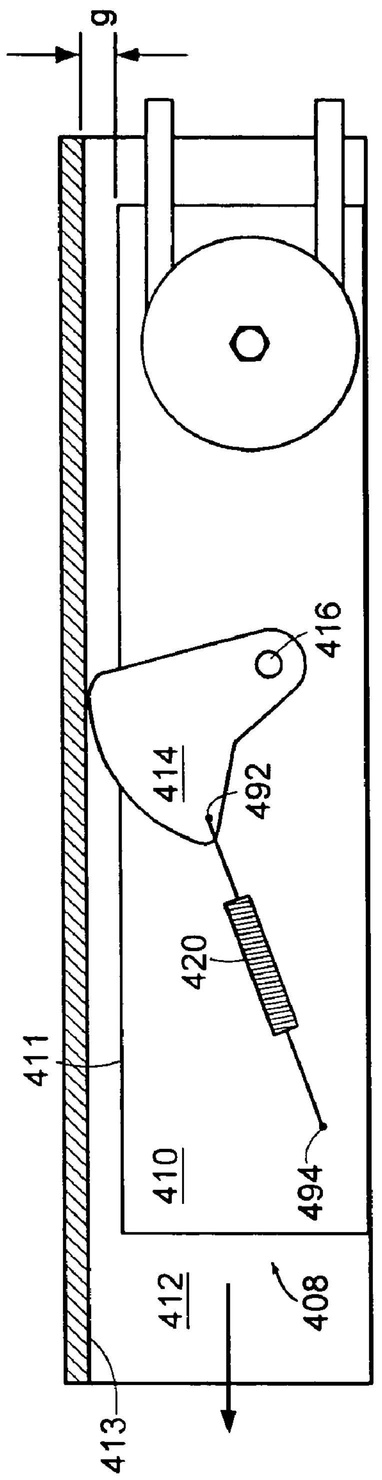

FIGS. 5A and 5B depict one embodiment of an inertially-activated brake assembly 408 including a translatable brake assembly 410 slideable along a track 412. A braking surface 413 is aligned with the track 412 along at least a portion of the track 412. Alternatively, the braking surface 413 is a side wall of the track 412. The track 412 and the braking surface 413 are fixed in relation to each other over the aligned portion of track 412, such that a clearance gap distance, "g," is defined between a side edge 411 of the translatable brake assembly 410 and the braking surface 413.

The translatable brake assembly 410 includes a pawl 414 pivotally attached at one end to a pivot point 416, thereby enabling the pawl 414 to rotate about the pivot 416. In FIG. 5A, the pawl 414 is illustrated in a stowed position, where the pawl 414 does not extend beyond the side edge 411 of the translatable brake assembly 410. A spring 420 is fastened at one end 492 to the pawl and at the other end 494 to the translatable brake assembly 410 to bias the pawl 414 in the stowed position.

Referring to FIG. 5B, the pawl 414 is illustrated in an engaged position in which at least a portion of the pawl 414 extends beyond the side edge 411 of the translatable brake assembly 410, thereby engaging the braking surface 413. A rapid acceleration, or jerking motion, of the inertially-activated brake assembly 408 in a particular direction (e.g., to the left, as shown) causes the pawl 414, through inertial force, to rotate clockwise about the pivot point 416. The inertia of the pawl 414, together with the acceleration of the translatable brake assembly 410, exerts a force upon the pawl bias spring 420, sufficient to extend the pawl bias spring 420. Thus, the pawl 414 rotates clockwise, as shown, from the stowed position (FIG. 5A) to the engaged position (FIG. 5B). As the pawl 414 engages the braking surface 413, the pawl 414 becomes wedged, thereby halting further translation of the inertially-activated brake assembly 408 and the translatable brake assembly 410.

Figure 6:
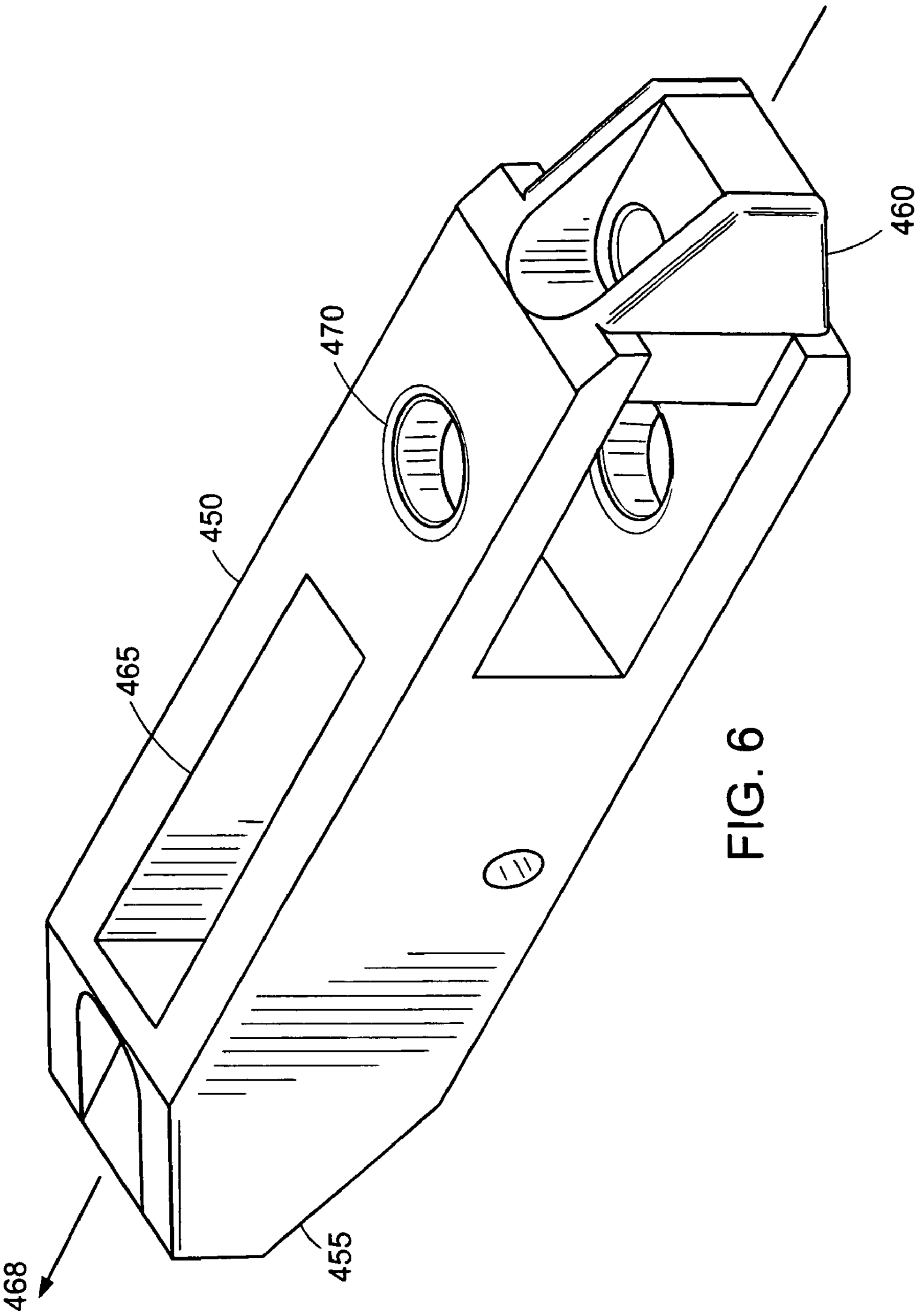
FIG. 6 is a schematic perspective view of a translatable block housing in accordance with the invention.

FIG. 6 shows one embodiment of a translatable block housing 450 for use in the translatable brake assembly 410. In one embodiment of the invention, the translatable block housing 450 replaces the frame 225 (FIG. 4A), or the frame 325 (FIG. 4B). The block housing 450 includes a first end 455 and a second end 460 configured in longitudinal opposition along a longitudinal axis 468. The block housing 450 also defines an elongated first cavity or pocket 465 located substantially along the axis 468, between the first end 455 and the second end 460. In some embodiments, the block housing 450 defines a second cavity 470 for accommodating a translatable pulley unit, such as that illustrated in FIGS. 4A and 4B.

The block housing 450 can be manufactured from any suitably rigid material. In one embodiment, the block housing 450 is manufactured from a metal, such as aluminum or zinc. In other embodiments, the block housing 450 is manufactured from polymers, ceramics, woods, or combinations thereof.

Figure 7C:
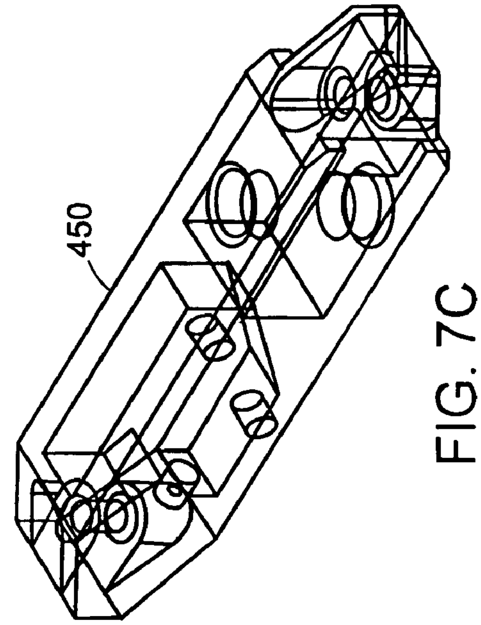
FIGS. 7A–7C are schematic side, top, and perspective views, respectively, of the translatable block housing of FIG. 6.
Figure 7A:
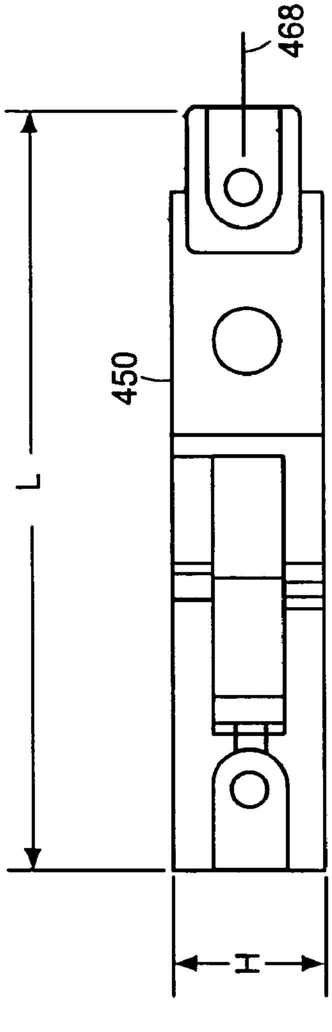
Figure 7B:
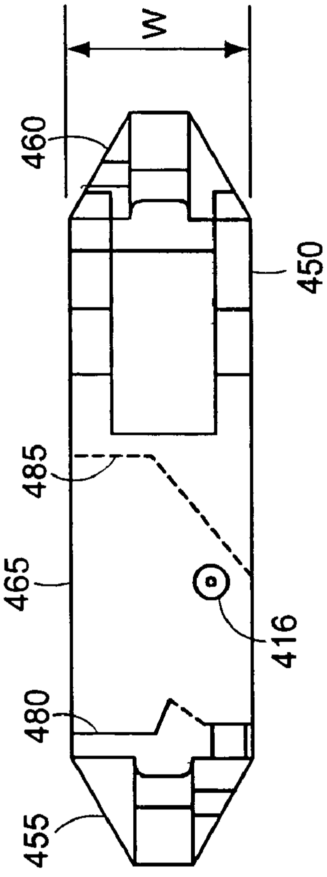

FIGS. 7A–7C, respectively illustrate side, top, and perspective views of the block housing 450. The pocket 465 includes a first end 480 and a second end 485. In one embodiment, the first end 480 of the pocket 465 is located closer to the block housing first end 455, whereas the second end 485 of the pocket 465 is located closer to the block housing second end 460. The pocket 465 includes a pin, trunnion, or pivot 416 located proximate the second end 485 of the pocket 465.

Generally, the block housing 450 is shaped and sized to fit with a track, such as the rigid U-shaped channel of FIGS. 2, 3, 4A, and 4B. For example, the block housing 450 can be generally rectangular in shape and have its length, "L," aligned with its longitudinal axis 468. For embodiments having a U-shaped track, the cross-sectional dimensions, "W" and "H," are generally selected to allow for at least a portion of the block housing 450 to reside within the U-shaped track. In some embodiments, the first and second ends 455, 460 can be tapered to facilitate translation of the block housing 450 along the track. Generally, a minimum length of the block housing 450 is selected to at least accommodate a diameter of a pulley, the longest dimension of the pawl 414, and end couplings for both a balance spring and a cord. In some embodiments, the block housing 450 can have a different shape, for example, cylindrical or elliptical.

Figure 8A:
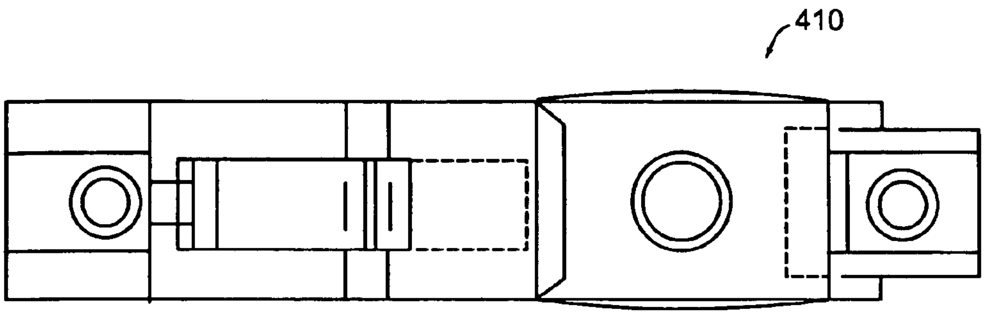
FIGS. 8A and 8B are schematic side and top views, respectively, of the translatable block housing of FIG. 6 including a pawl.
Figure 8B:
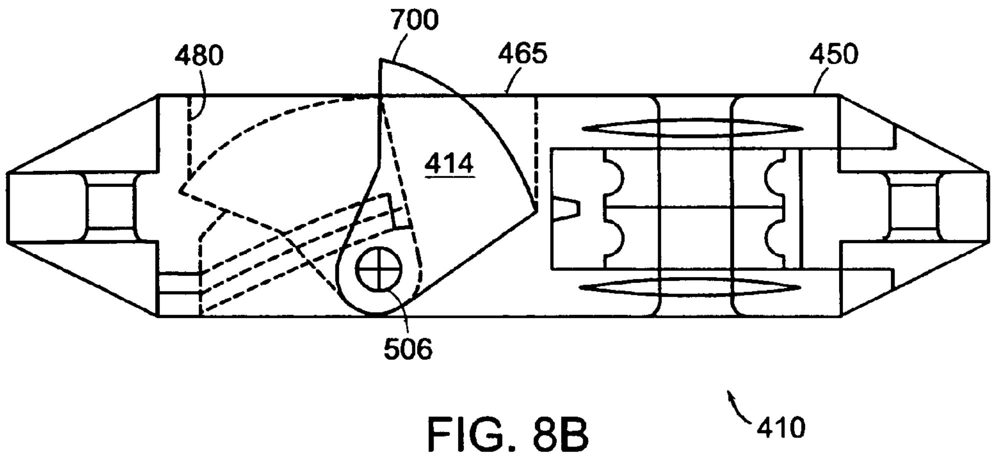

FIGS. 8A and 8B respectively illustrate side and top views of the translatable brake assembly 410. The translatable brake assembly 410 includes the block housing 450 and the pawl 414 disposed within the pocket 465. The pawl 414 is pivotally attached at one end to the pivot 506. The pawl 414 is shown in an engaged position, having a portion of the pawl 414 protruding from the pocket 465. The pawl 414 is also shown in a stowed position (shown in phantom), in which substantially the entire pawl 414 is contained within the pocket 465. The translatable brake assembly 410 also includes the pawl bias spring 420. As previously described, the first spring end 494 is fixedly attached to the block housing 450. For example, the first spring end 494 can be fastened to a hook or otherwise be attached to the first end 480 of the interior of the pocket 465. A second spring end 492 is attached to the pawl 414 and can be disposed in a cavity formed between the side walls of the pawl 414. In the absence of a rapid acceleration, such as when the brake assembly 410 is at rest or moving at a relatively slow rate during, for example, periods of normal operation of the window, the tension of the pawl bias spring 420 biases the pawl 414 in the stowed position.

Figure 9:
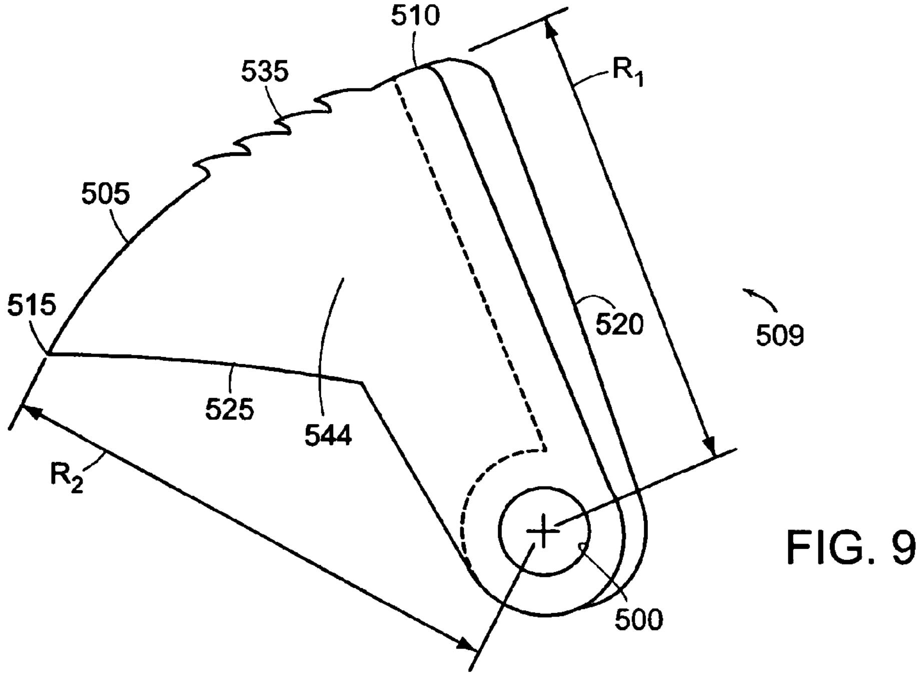
FIG. 9 is a schematic perspective view of the pawl of FIGS. 8A and 8B.

One embodiment of a pawl 509 in accordance with the invention is shown in FIG. 9. The pawl 509 defines an aperture 500 at one end thereof. The aperture 500 is concentric with a pivot point about which the pawl 509 rotates. The pawl 509 is defined by an arcuate edge 505 having a first end 510 and a second end 515. The arcuate edge 505 is radially disposed from the center point of the aperture 500. The pawl 509 is further defined by a leading edge 520 extending from the first end 510 of the arcuate edge 505 and a trailing edge 525 extending from the second end 515 of the arcuate edge 505. A first radial distance $R_1$ is defined by the distance measured proximate to the leading edge 520 between the center of the aperture 500 and the first end 510 of the arcuate edge 505. A second radial distance $R_2$ is defined by the straight-line distance measured generally along the trailing edge 525 between the center of the aperture 500 and the second end 515 of the arcuate edge 505. Generally, the second radial distance $R_2$ is greater than the first radial distance $R_1$; however, these distances will very to suit a particular application.

The pawl 509 can be manufactured from any suitably rigid material. In one embodiment, the pawl 509 is manufactured from, for example, a metal, such as steel, stainless steel, aluminum, or zinc. In other embodiments, the pawl 509 is manufactured from, for example, polymers, ceramics, or woods. The pawl 509 can also be manufactured from combinations of these materials or any other suitable material.

In some embodiments, at least a portion of the arcuate edge 505 is configured to enhance its frictional engagement with a braking surface, such as the inner side wall of the track. In one embodiment, a portion 535 of the arcuate edge 505 can be serrated, knurled, or otherwise roughened. Alternatively, the portion 535 of the arcuate edge 505 can include a frictional material. For example, a natural or synthetic rubber compound can be applied to at least a portion of the arcuate edge 505. Alternatively, an applied compound can include a grit, such as silica or ceramic. The compounds can be applied to the arcuate edge 505 through standard application techniques, including painting (e.g., brushing, dipping, or spraying), inking, and other deposition techniques, such as chemical vapor deposition. Alternatively or additionally, the braking surface of the inner side wall of the track can be configured to enhance its frictional engagement with the arcuate edge 505.

Figure 10:
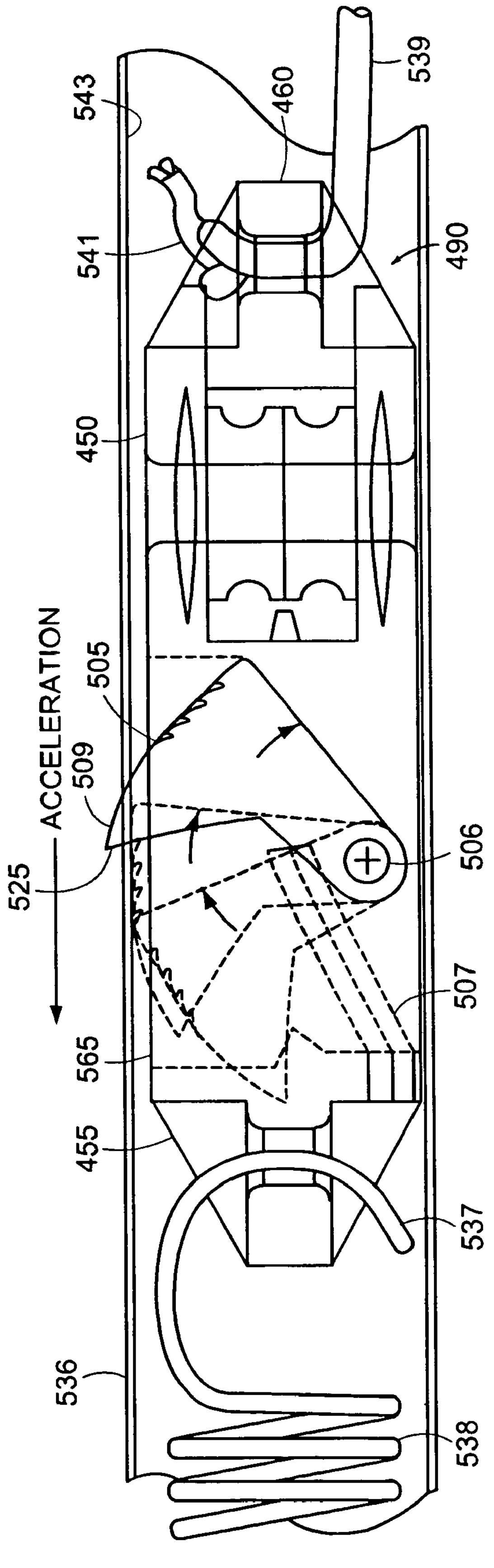
FIG. 10 is a schematic top view of the translatable block assembly of FIGS. 8A and 8B shown in greater detail.

Referring to FIG. 10, a translatable brake assembly 490 is shown slideably disposed within a track 536. As illustrated, the track 536 includes a rigid U-shaped channel (similar to channels 205, 305 in FIGS. 4A and 4B). An interior surface of one of the edges of the rigid track 536 provides a braking surface 543. The translatable brake assembly 490 is disposed within the channel 536, such that the opening of the pocket 565 faces the braking surface 543. A first end 537 of a balance spring 538 is attached to the first end 455 of the block housing 450 and provides tension, pulling the translatable brake assembly 490 in a first direction along the rigid track 536 (i.e., to the left, as depicted in FIG. 10). A first end 541 of a cord 539 is attached to the second end 460 of the block housing 450 and provides an opposing tension, tending to pull the translatable brake assembly 490 in a second direction along the rigid track 536 as a window sash is moved. Under normal operation, the opposing tensions generally balance each other and the translatable brake assembly 490 translates slowly in the channel 536 as the associated sash is raised and lowered.

In operation, the tension of a pawl bias spring 507 pulls the trailing edge 525 of the pawl 509 and rotates the pawl 509 in a first direction (e.g., a counter-clockwise direction) about the pivot 506. Rotation of the pawl 509 in the first direction maintains the pawl 509 in a stowed position, substantially contained within the pocket 565, such that no portion of the pawl 509 is in contact with the braking surface 543. The tension of the pawl bias spring 507 is generally calibrated such that the pawl 509 remains in its stowed position during all periods of normal operation (e.g., during periods of installation and normal operation of the one or more window sashes).

For situations in which the translatable brake assembly 490 is subjected to a sudden acceleration along the track 536 in a first direction (e.g., to the left, as shown), the pawl 509 moves with respect to the translatable brake assembly 490 to an engaged position resulting in a braking action that generally prohibits further translation of the translatable brake assembly 490 in the first direction. During periods of sudden acceleration in the first direction, such as those experienced during a sudden release of the cord tension, the translatable brake assembly 490 begins to accelerate and translate rapidly along the track 536. The pivot 506, being fixedly attached to the block housing 450, also travels with the translatable brake assembly 490.

Referring again to FIG. 9, the pawl 509 constitutes an inertial mass 544 disposed remotely from the pivot 506 that tends to resist any sudden motion. The pawl 509 is configured and weighted so as not to inhibit free rotation operation of the pawl 509. For example, the inertial mass 544 can be the mass distribution of the pawl 509 itself, or can be an additional element, such as a relatively flat rectangular chip or a flat circular disk. The inertial mass 544 can be embedded in or fixedly coupled to the pawl 509 using a mechanical fastener, such as a screw, a clip, an interference fit, or fastened thereto using a an adhesive or a weld. In some embodiments, the inertial mass 544 is provided by the mass of the pawl 509 itself. In other embodiments, the inertial mass 544 is provided by combinations of an external mass with the mass of the pawl 509 itself.

The relative motion of the pivot 506 in the first direction relative to the inertial mass 544 of the pawl 509 results in the pawl 509 rotating in a second direction (e.g., a clockwise direction). As the pawl 509 rotates, the increasing radius of the arcuate edge 505 closes any clearance gap between the pawl 509 and the braking surface 543 until the arcuate edge 505 makes contact with the braking surface 543. Frictional forces between the pawl 509 and the braking surface 543 maintain the pawl 509 in contact with the braking surface 543 (i.e., the pawl bias spring 507 fails to overcome the frictional forces that would otherwise return the pawl 509 to its stowed position). With the pawl 509 remaining in contact with the braking surface 543, any additional force pulling the translatable brake assembly 490 in the first direction, such as that provided by the balance spring 538, places additional rotational force upon the pawl 509 in the second direction. The additional rotational force further rotates the pawl 509 in the second direction, thereby increasing the radius of the arcuate edge 505 along the perpendicular to the braking surface 543, consequently increasing the frictional force between the pawl 509 and the braking surface 543. The pawl 509 generally remains stationary, wedging the translatable brake assembly 490 in the track 536. By maintaining tension in this manner upon the balance spring 538, the inertial braking system 490 prevents a sudden and potentially harmful release of the potential energy stored within extended balance spring 538.

The pawl 509 can be automatically returned to its stowed position by applying tension in the second direction (i.e., directed to the right, as shown in FIG. 1O) along the track 536. Translation of the translatable brake assembly 490 in the second direction (i.e., opposing the balance spring tension) translates the pivot 506 in the second direction. As frictional forces initially hold the arcuate edge 505 stationary against the braking surface 543, the pawl 509 is rotated in a first direction about the pivot 506. The radius of the arcuate edge 505 decreases as the pawl 509 rotates in the first direction. Accordingly, the frictional forces holding the arcuate edge 505 against the braking surface 543 are reduced until, ultimately, the tension of the pawl bias spring 507 returns the pawl 509 to its stowed position.

In some applications, the braking action provided by the pawl 509 may be insufficient to completely stop and/or prohibit further translation of the brake assembly 490. For example, if the tension of the balance spring 538 is too great, the spring may pull the pawl 509 to overcome the coefficient of friction against the breaking surface 543, thereby resulting in slippage and or damage to the pawl 509 and/or the braking surface 543. Alternatively or additionally, excessive tension of the balance spring 538 may cause the side walls of the track 536 to expand. Such a deformation of the track 536 can result in further movement of the brake assembly 490 along the track 536 or cause the inertial brake assembly 490 to become dislodged from the track 536 altogether.

Figure 11A:
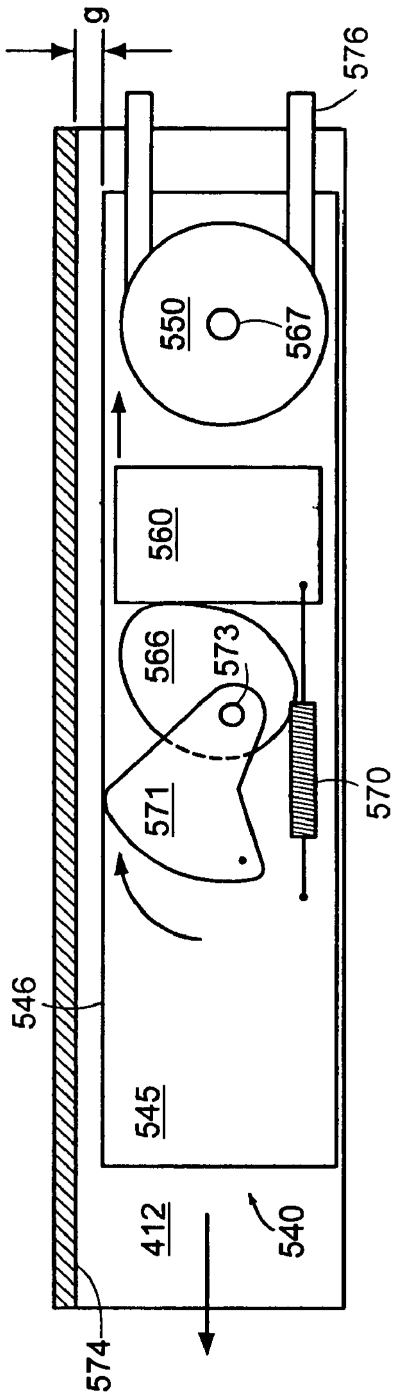
FIG. 11A is a schematic representation of an alternative embodiment of an inertial braking assembly in accordance with the invention.
Figure 11B:
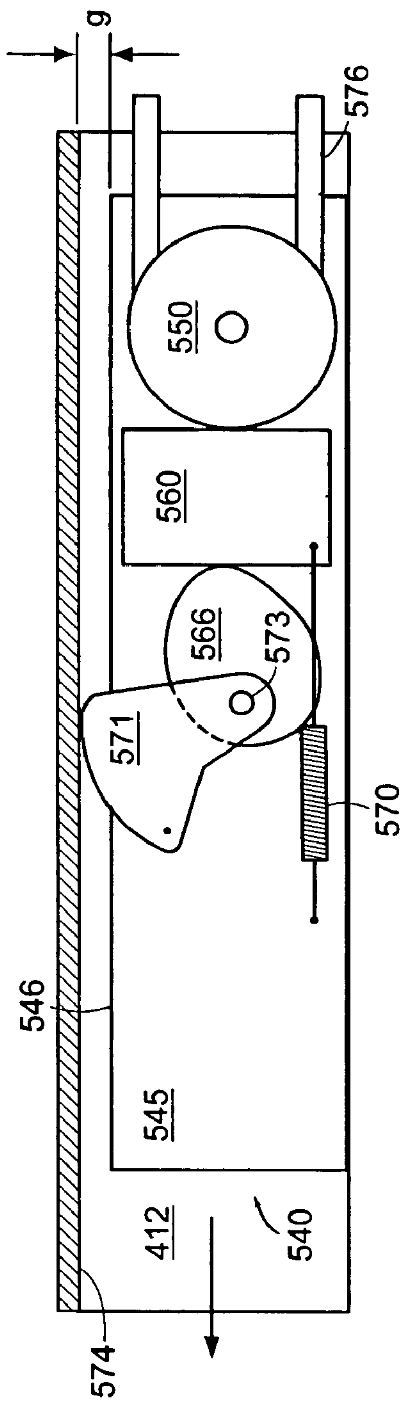
FIG. 11B is a schematic representation of the inertial braking assembly of FIG. 11A in an engaged state.

An alternative embodiment of an inertially-activated brake assembly 540 includes a dual-action inertially-activated brake adapted to provide an additional braking action. As shown in FIGS. 11A and 11B, a dual-action inertially activated brake assembly 540 includes a translatable dual-action brake housing 545, which further includes a pawl 571 pivotally attached at one end to a pivot point, for example, a pin or trunnion 573. The translatable dual-action brake housing 545 also serves as the block of a block and tackle window balance system and includes at least one pulley 550 about which a cord 576 is strung, a brake shoe assembly 560, and a cam 566. The pulley 550 is generally rotatably coupled to the translatable dual-action brake housing 545 through a pulley axle 567.

As discussed in relation to FIGS. 5–10, the pawl 571 is attached to and rotatable about the pivot 573. A cam 566 is also configured to rotate about the pivot 573 in a fixed relationship to the pawl 571. In some embodiments, the pawl 571 is fixedly attached to the cam 566. For example, the pawl 571 can be mechanically and/or chemically fastened to the cam 566 (e.g., bolted, clamped, welded, or chemically bonded). Alternatively, the pawl 571 and the cam 566 can be formed as a single integral element by, for example, injection molding, and/or machining. In other embodiments, the pawl 571 and the cam 566 can be separate from each other, with each being separately coupled to the pivot 573. The brake shoe assembly 560 is disposed between the cam 566 and the pulley 550 and is slideably coupled to the translatable, dual-action brake housing 545.

Referring to FIG. 11A, the pawl 571 is illustrated in the stowed position, where the pawl 571 does not extend beyond a side edge 546 of the translatable dual-action brake housing 545. Optionally, a brake shoe bias spring 570 can be fastened at one end to the brake shoe assembly 560 and an opposite end to the translatable dual-action brake housing 545, thereby biasing the brake shoe assembly 560 toward the cam 566, and leaving a gap between the brake shoe assembly 560 and the pulley 550. As illustrated, in the stowed position, the cam 566 is aligned in a first direction (i.e., counter-clockwise) allowing the pawl 571 to remain in the stowed position (i.e., not engaging a braking surface 574).

Referring to FIG. 11B, the pawl 571 and brake shoe assembly 560 are illustrated in the engaged position in which at least a portion of the pawl 571 extends beyond the side edge 546 of the translatable dual-action brake housing 545 to engage the braking surface 574 and at least a portion of the brake shoe assembly 560 compresses at least a portion of the cord 576 (e.g., compressing the cord 576 against the pulley 550). A rapid acceleration of the inertially-activated dual-action brake assembly 540 in a particular direction (e.g., to the left, as shown) causes, through inertial force, the brake shoe assembly 560 to translate in an opposite direction (in this example, to the right) and the pawl 571 to rotate (in this example, clockwise) with respect to the pivot 573. The inertia of the brake shoe assembly 560, together with the acceleration of the translatable dual-action brake housing 545 to the left, exerts a force upon the brake shoe bias spring 570 sufficient to extend the brake shoe bias spring 570. The brake shoe assembly 560 may initially come into contact with the cord 576, but the inertial force alone may not be enough to initiate braking by compressing the cord 576. In a first braking action (as described in relation to FIG. 10) the pawl 571 rotates as shown from the stowed position to the engaged position. As the pawl 571 engages the braking surface 574, the pawl 571 becomes wedged, thereby inhibiting further translation of the inertial brake assembly 540 to the left.

A second braking action in combination with the friction provided by the pawl 571 generally provides greater stopping capability than the single braking action of the pawl 571 acting alone. Namely, the brake shoe assembly 560 compresses the cord 576 against the pulley 550, thereby slowing or stopping altogether the advancement of the cord 576 through the pulley 550. Referring still to FIG. 11B, a relative orientation of the pawl 571 and the cam 566 is selected to cause the cam 566 to push against at least one side of the brake shoe assembly 560 when the pawl 571 is engaged. With a suitable spacing and sizing of the pawl 571, pulley 550, brake shoe assembly 560, and cam 566, an engaged pawl 571 results in the brake shoe assembly 560 being further compressed against the cord 576 by the cam 566, thereby securing the cord 576 against the pulley 550.

Figure 12A:
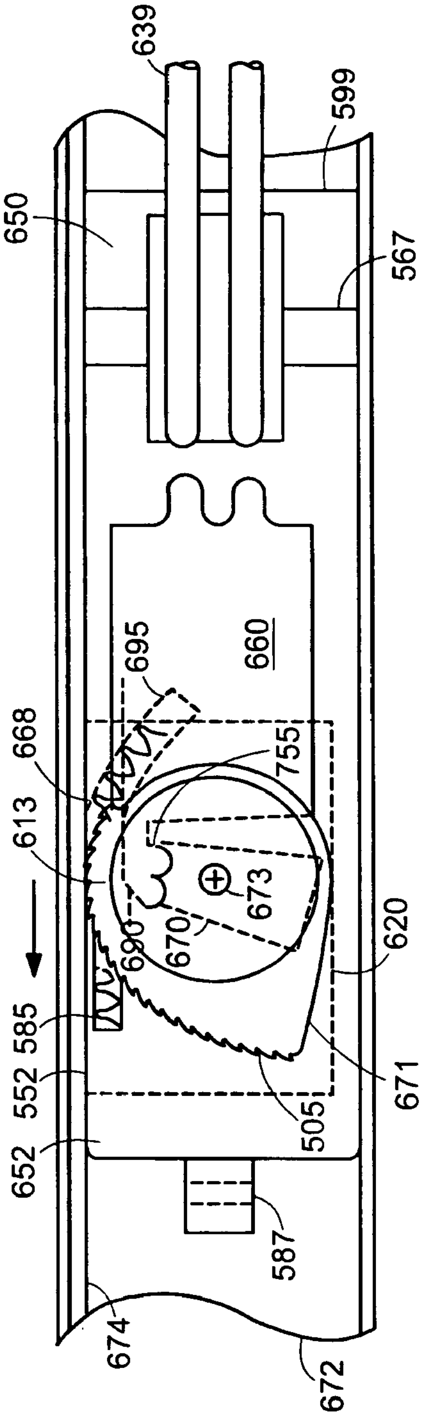
FIGS. 12A and 12B are schematic side and top views, respectively, of an alternative embodiment of an inertial braking assembly including a brake shoe assembly in accordance with the invention.
Figure 12B:
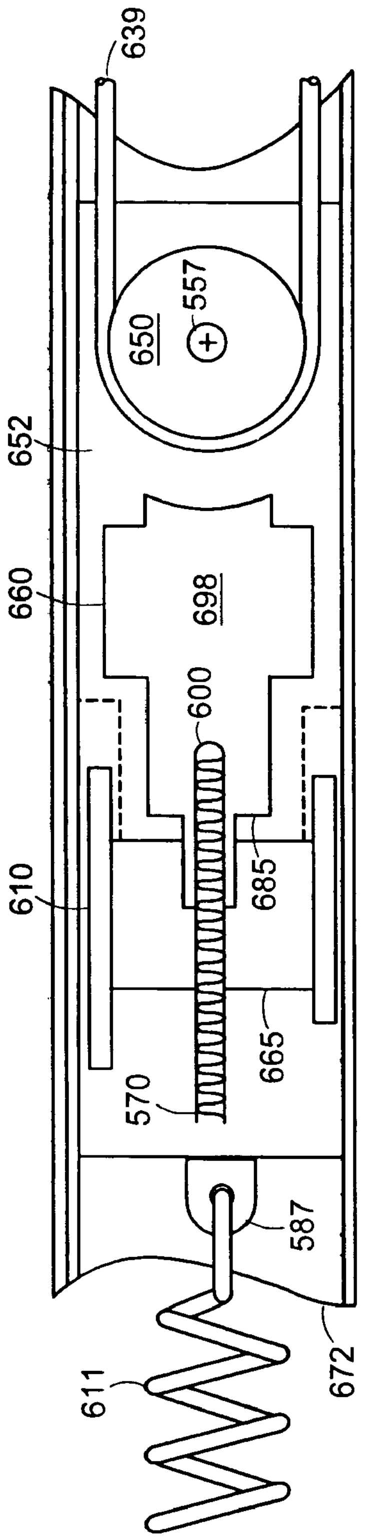

Referring to FIGS. 12A and 12B, an alternative embodiment of a translatable brake assembly 599 is illustrated. The translatable brake assembly 599 is slideably disposed within a track 672. The track 672 includes a rigid U-shaped channel, an interior surface of one of the edges of the rigid U-shaped channel providing a braking surface 674. The translatable brake assembly 599 is disposed within the channel 672 such that the opening of a pocket 552 faces the braking surface 674. The first end of a balance spring 611 is attached to a first end 587 of a block housing 652 and provides tension, pulling the translatable brake assembly 599 in a first direction along the track 672 (i.e., to the left, as depicted in FIG. 12A).

In normal operation, a brake shoe bias spring 668 provides a tension pulling a trailing edge 685 of a brake shoe assembly 660 and translating the brake shoe assembly 660 in a first direction away from a pulley 650. Translation of the brake shoe assembly 660 also results in a rotation of the of a pawl 671 in a first direction maintaining the pawl 671 in the stowed position, substantially contained within the pocket 552 such that no compression is provided by the brake shoe assembly 660 upon either the cord 639 or the pulley 650, and substantially no portion of the pawl 671 is in contact with the braking surface 674. The tension of the brake shoe bias spring 668 is generally calibrated such that the brake shoe assembly 660 and pawl 671 remain in their respective stowed positions during all periods of normal operation (e.g., during periods of installation and normal operation of the one or more window sashes).

During periods of sudden acceleration in the first direction, such as those that would be experienced during a release of the cord tension, the translatable brake assembly 599 begins to accelerate and translate the translatable brake assembly 599 rapidly in the first direction. A pivot 673, being fixedly coupled to the block housing 652 also travels with the translatable brake assembly 599. The brake shoe assembly 660 includes an inertial mass 698 that tends to resist any sudden motion. The relative motion of the housing 652 in a first direction relative to the inertial mass 698 of the brake shoe assembly 660 results in the brake shoe assembly 660 translating in a second direction (i.e., towards the pulley 650). The movement of the brake shoe assembly 660 in the second direction results in the initiation of the first braking action. Namely, a rotation of the pawl 671 in a second direction (e.g., a clockwise direction). As the pawl 671 rotates, it becomes wedged between the pivot 673 and the braking surface 674, as discussed in relation to FIG. 10. Likewise, rotation of the pawl 671 results in a similar rotation of the cam 665, thereby initiating the second braking action. As the pawl 671 frictionally engages the braking surface 674, the pawl 671 increases the torque acting upon the cam 665. The applied torque forces the cam 665 into the trailing surface 685 of the brake shoe assembly 660, causing the brake shoe assembly 660 to compress the cord 639 against the pulley 650.

Again, the pawl 671 generally remains stationary, wedging the translatable brake assembly 599 in the track 672 and wedging the brake shoe assembly 660 into the cord 639. By maintaining tension in this manner upon the balance spring 611, the inertial braking system prevents a sudden and potentially harmful release of the potential energy stored within extended balance spring 611.

The pawl 671 can be automatically returned to its stowed position by applying tension in the second direction (i.e., to the right, as shown in FIGS. 12A and 12B) along the track 672. Translation of the brake assembly 599 in the second direction (i.e., opposing the balance spring tension) pivots the pawl 671 in the first direction. The radius of the arcuate edge 605 decreases as the pawl 671 rotates in the first direction. Accordingly, the frictional forces holding the arcuate edge 605 against the braking surface 674 are reduced until, ultimately, the tension of a pawl bias spring releases the pawl 671 from the braking surface 674.

Once the pawl 671 is released from the braking surface 674, the force holding the brake shoe assembly 660 against the cord 639 is released. At this point, the tension of the bias spring 668 pulls the brake shoe assembly 660 away from the pulley 650, towards its seated position. The trailing surface 685 of the brake shoe assembly 660 likewise applies a force to the cam 665, causing it to rotate together with the pawl 671 to its stowed position.

Figure 13C:
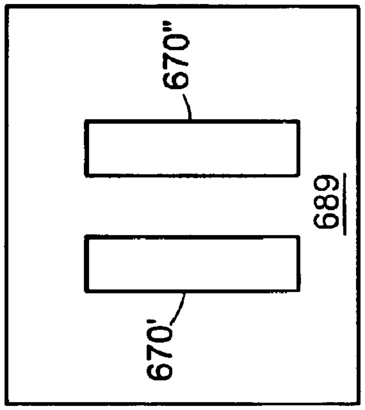
FIGS. 13A–13C are schematic side, top, and end views, respectively, of one embodiment of a brake shoe in accordance with the invention.
Figure 13A:
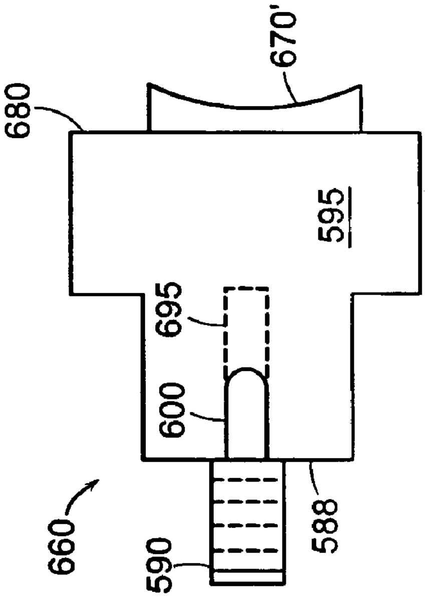
Figure 13B:
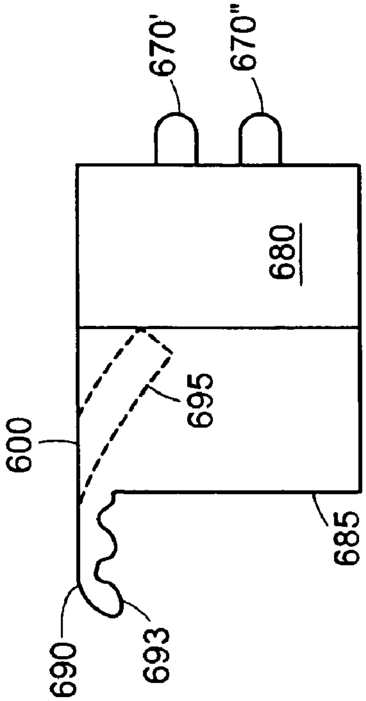

Referring now to FIGS. 13A–13C, and in more detail, the brake shoe assembly 660 generally includes one or more brake shoes 670 disposed at a forward surface 680 of a brake shoe assembly 660. In one embodiment, two brake shoes 670', 670" (generally 670) form or are fixedly attached to the forward surface 680. When installed within the inertial brake assembly 599, each of the individual brake shoes 670', 670" are aligned with a respective pulley 650. In some embodiments, the brake shoes 670 include an arcuate surface adapted to ensure frictional contact with the cord 676 and/or pulley 650. For maximum braking action, contact can be maintained along substantially the entire surface of the brake shoe 670, when engaged. For example, in one embodiment, the brake shoes 670', 670" are formed with a concave surface having a radius substantially equivalent to a radius of the pulley 650.

Generally, the brake shoe assembly 660 is made from a rigid, minimally compressible material, such as metals, polymers, ceramics, hard woods, and combinations thereof. In one particular embodiment, the brake shoe assembly 660 is made of zinc. Additionally, in some embodiments, the brake shoe assembly 660 is made from a high-density material, improving its related inertial characteristics. The brake shoe assembly 660 can be formed by casting, injection molding, and/or machining a desired material, or other suitable method.

In some embodiments, the brake shoe assembly 660 includes a drive mechanism 613 (FIG. 12A) to transfer inertial energy from the brake shoe assembly 660 to the cam 665 and/or the pawl 671. In one embodiment, the drive mechanism 613 includes a gear drive. For example, the gear drive can include a rack gear 690 and a pinion gear 755 (FIG. 12A). In one embodiment, the rack gear 690 is fixedly attached and disposed at the trailing surface 685 of the brake shoe assembly 660. The rack 690 includes teeth 693 adapted to mesh with the pinion gear 755 (FIG. 12A). The pinion gear 755 is coupled to the pawl 671, such that rotation of the pinion gear 755 results in a likewise rotation of the pawl 671.

Additionally, in some embodiments, the assembly 660 includes structure for anchoring the brake shoe bias spring 668. In one particular embodiment, the housing 660 defines a bore 695 having at least one aperture 600. The bore 695 is conical, having a diminishing radius as the bore 695 extends inward from the aperture 600. The spring 668 having a suitable outside diameter (e.g., an outside diameter smaller than the radius of the aperture 600, but larger than at least a portion of the tapered radius of the bore 695) is anchored to the brake shoe housing 660 by a compression interference fit of the spring 668 into the bore 695. Additionally, the spring 668 can be mechanically coupled to the brake shoe assembly 660 by, for example, a screw, a rivet, or an interference fit. Alternatively, the spring 668 can be chemically coupled to the brake shoe housing 660, for example, using glue, soldering, or welding.

Figure 14A:
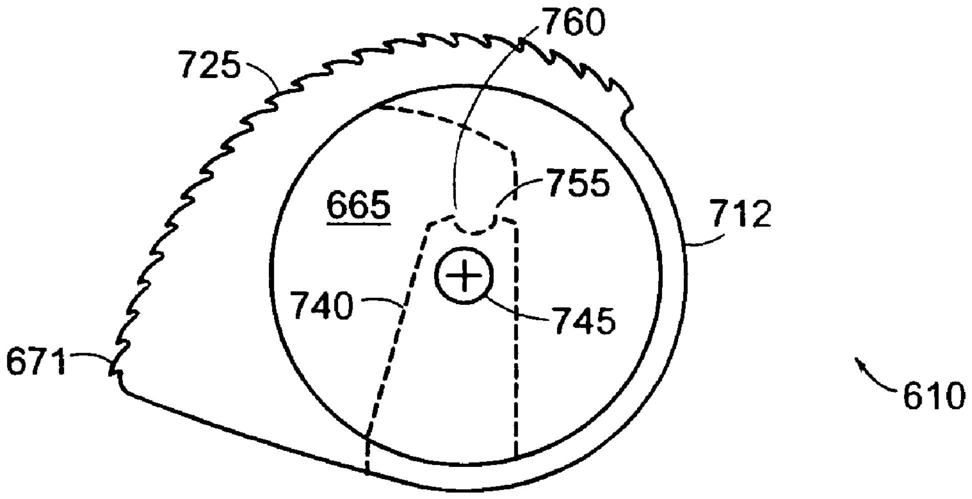
FIGS. 14A and 14B are schematic top and side views, respectively, of one embodiment of a brake driver assembly in accordance with the invention.
Figure 14B:
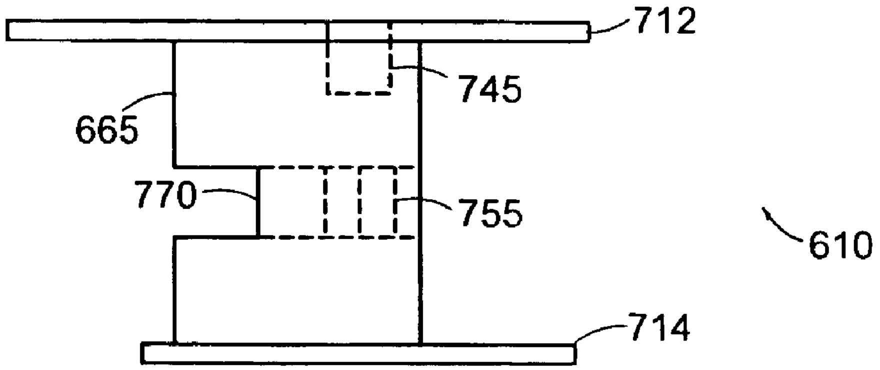

FIGS. 14A and 14B depict a brake driver assembly 610 including a top element 712 and a bottom element 714, where each element 712, 714 is fixed in relation to the other and interconnected through the cam 665. The top element 712 is disposed substantially parallel to the bottom element 714. The top element 712 includes the pawl 671 having an arcuate edge and a frictional surface 725 disposed along at least a portion of the arcuate edge. The top element 712 optionally includes a key 745 (e.g., a slot to accommodate a screwdriver or a suitably shaped bore to accommodate a wrench) to allow for manual activation of the brake assembly. The bottom element 714 is generally formed as a circular disk, having a radial center substantially aligned with a radial center of the top element 712. The two elements 712, 714 are each fixedly attached to or integral with a cylindrical segment defining the cam 665, over at least a portion thereof.

In some embodiments a drive element, such as the pinion gear 755, is provided between the top element 712 and the bottom element 714 and is axially disposed relative to the cam 665. The pinion gear 755 includes teeth 760 adapted to mesh with the teeth 693 of the rack gear disposed on the brake shoe assembly 660 (FIGS. 13A–13C). In one embodiment, the positioning and the shape of the teeth 760 facilitate operation with the cam 665. Namely, the pinion teeth 760 are disposed with non-uniform spacing. The non-uniform spacing is dictated by the operation of the pawl 671 and cam 665 assembly. During initial rotation of the pawl 671 from its stowed position, the pinion gear 755 engages the rack gear 690; however, as the pawl 671 engages the braking surface 674, the cam 665 forces the brake shoe assembly 660 towards the pulley 650 and away from the pinion gear 755. Thus, the rack and pinion gear drive must either disengage, or operate with a different gear ratio to allow the cam-induced translation of the brake shoe assembly 660.

In one embodiment, the pinion gear 755 includes a first series of teeth 760 adapted to engage the rack gear 690 when the pawl 671 is in its stowed position and a second series of teeth 740 allowing slideable rotation of the rack gear 690 with respect to the pinion gear 755, when the cam 665 engages the trailing edge 685 of the brake shoe housing 660. The second series of teeth 740 can include a smoothed trailing edge allowing the pinion gear 755 to freely rotate. The transition between the first and second series of teeth defines a transition from when the inertial mass 698 of the brake shoe assembly 660 first rotates the pawl 671, and then the initially engaged pawl 671 rotates the cam 665, further translating the brake shoe assembly 660 towards the pulley 650.

Figure 15A:
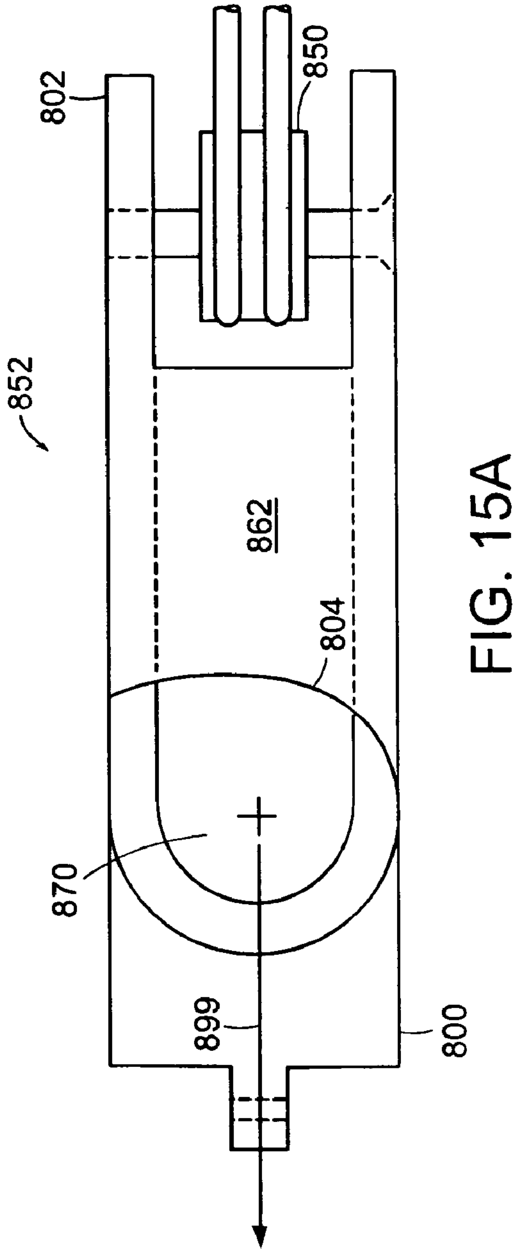
FIGS. 15A and 15B are schematic top and side views, respectively, of an alternative embodiment of a translatable block housing for an inertial braking assembly in accordance with the invention.
Figure 15B:
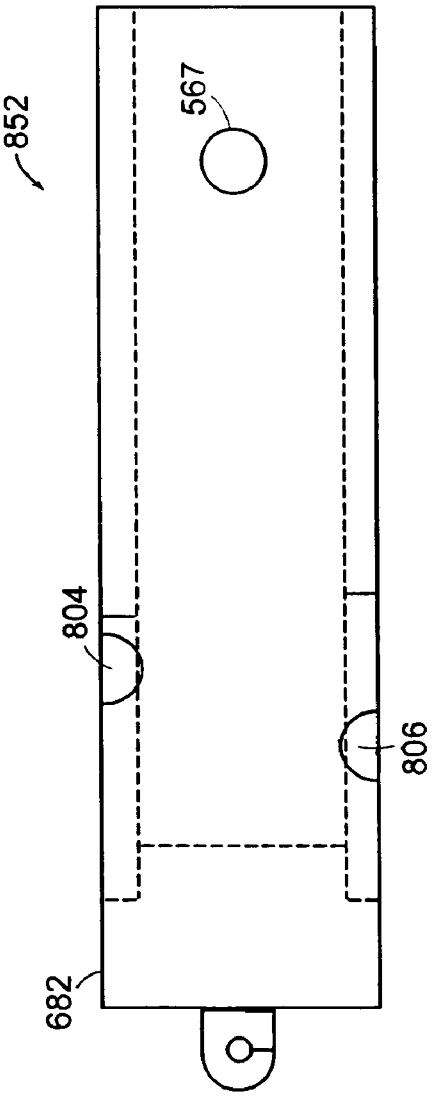

FIGS. 15A and 15B depict an alternative embodiment of a housing 852 configured to include a dual-action inertial brake. The housing 852 includes a first end 800 and a second end 802 configured in longitudinal opposition. The housing 852 also defines an elongated cavity or pocket 862 that is located substantially along a longitudinal axis 899 between the first and second ends 800, 802. Generally, the pocket 862 accommodates a pulley 850. Additionally, the pocket 862 accommodates the components of the dual-action inertial brake.

In one embodiment, the housing 852 includes a top bore 804 at an end of the pocket 862 proximate the second end 802. The top bore 804 is perpendicularly disposed to the axis 899 of the elongated cavity 862. The size and shape of the top bore 804 are selected to accommodate the seating and free rotation of the top element 712 of the brake driver assembly 610. Similarly, a bottom bore 806 is provided on an opposite side of the housing 852 to the top bore 804. The bottom bore 806 is sized and shaped to accommodate the seating and free rotation of the bottom element 714 of the brake driver assembly 610. The housing 852 also defines an opening or gap 870 between the top and bottom bores 804, 806. The size of the gap 870 is sufficient to accommodate the free rotation of the cam 665 portion of the brake driver assembly 610.

In one embodiment, the brake driver assembly 610 may be constructed as at least two pieces; a first piece including the cam 665 and one of the top and bottom elements 712, 714; and a second piece including the other of the top and bottom elements 712, 714. During assembly, the first piece can be inserted into the gap 870 from the appropriate one of the top or bottom bores 804, 806, and then the second piece can be fastened to the first piece, thereby securing the brake driver assembly 610 within the housing 852. The bores 804, 806 function to maintain the brake driver assembly 610 in proper alignment, allowing, as required, free rotation and operation of the brake driver assembly 610.

The block housing 852 can be manufactured from any suitable rigid material. In one embodiment, the block housing 852 is manufactured from a metal, such as aluminum or zinc. In other embodiments, the block housing 680 is manufactured from polymers, ceramics, woods, or combinations thereof.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A block and tackle window balance system comprising:

a track;

a translatable block assembly moveably disposed at least partially within the track;

a balance spring having a first end fixed relative to the track and a second end coupled to one end of the translatable block assembly;

a cord comprising a first cord end and a second cord end, wherein the first cord end is attached to an opposite end of the translatable block assembly and the second cord end is attached to a jamb when installed in a window;

a brake comprising a pawl coupled to the translatable block assembly, wherein the pawl pivots to engage the track in response to a rapid acceleration of the translatable block assembly along the track;

a cam coupled to the pawl; and a brake shoe in communication with the cam and disposed between the cam and at least a portion of the cord, wherein the pawl rotates the cam as the pawl pivots, thereby causing the brake shoe to engage the cord in response to the rapid acceleration of the translatable block assembly along the track.

2. The system of claim 1, further comprising a bias spring having a first end and a second end, wherein the first end is coupled to the translatable block assembly and the second end is coupled to the brake shoe.

3. The system of claim 1, further comprising a drive train for coupling the pawl and the brake shoe.

4. The system of claim 3, wherein the drive train comprises:

a rack gear coupled to the brake shoe; and a pinion gear coupled to the pawl and engageable with the rack gear.

5. A block and tackle window balance system comprising:

a track;

a translatable block assembly moveably disposed at least partially within the track;

a balance spring having a first end fixed relative to the track and a second end coupled to one end of the translatable block assembly;

a cord comprising a first cord end and a second cord end, wherein the first cord end is attached to an opposite end of the translatable block assembly and the second cord end is attached to a jamb when installed in a window; and a brake coupled to the translatable block assembly, wherein the brake activates in response to a rapid acceleration of the translatable block assembly along the track.

6. The system of claim 5, wherein the brake comprises a pawl coupled to the translatable block assembly, wherein the pawl pivots to engage the track in response to the rapid acceleration of the translatable block assembly along the track.

7. The system of claim 5, wherein the second end of the balance spring is directly coupled to one end of the translatable block assembly.

8. An inertial braking system for a block and tackle window balance device comprising:

a track;

a translatable block assembly defining a pocket and moveably disposed at least partially within the track; and a brake coupled to the translatable block assembly and disposable within the pocket, wherein the brake activates in response to a rapid acceleration of the translatable block assembly along the track, wherein the brake comprises a pawl pivotably coupled to the translatable block assembly, wherein the pawl pivots to engage the track in response to the rapid acceleration of the translatable block assembly along the track, and wherein the pawl comprises:

an arcuate surface having a first end and a second end circumferentially disposed relative to a pivot point of the pawl;

a first radial distance defined from the pivot point to the first end of the arcuate surface; and a second radial distance defined from the pivot point to the second end of the arcuate surface, wherein the second radial distance is greater than the first radial distance.

9. The system of claim 1, further comprising a pawl-bias spring having a first end and a second end, wherein the first end is coupled to the translatable block assembly and the second end is coupled to the pawl, the pawl-bias spring biasing the pawl toward a stowed position.

10. The system of claim 1, wherein at least a portion of the arcuate surface comprises a frictional surface.

11. The system of claim 10, wherein the frictional surface is serrated.

12. The system of claim 1, wherein the brake is pivotable about a pivot point and the brake further comprises an inertial mass disposed remotely from the pivot point.

13. The system of claim 12, wherein motion of the pivot point in a first direction relative to the inertial mass of the brake results in the brake rotating in a second direction.

14. The system of claim 1, wherein the brake rotates about a pivot point in response to the rapid acceleration of the translatable block assembly along the track.

15. A method of inhibiting rapid acceleration of a component of a block and tackle window balance system, the method comprising the steps of:

providing a track;

providing a translatable block assembly movably disposed at least partially within the track;

providing a brake, the brake comprising a pawl and a cam, the pawl and the cam each pivotally coupled to the translatable block assembly, the cam in communication with a brake shoe; and activating the brake in response to a rapid acceleration of the translatable block assembly in a first direction along the track.

16. The method of claim 15, wherein the cam biases the brake shoe against a cord comprising a first cord end and a second cord end, wherein the first cord end is attached to the translatable block unit and the second cord end is attached to a jamb.

* * * * *